(12) United States Patent
Abbott et al.

(10) Patent No.: US 7,087,652 B2
(45) Date of Patent: Aug. 8, 2006

(54) PROCESS FOR THE PRODUCTION OF HYDROCARBONS

(75) Inventors: Peter Edward James Abbott, Cleveland (GB); Martin John Fernie, Cleveland (GB)

(73) Assignee: Johnson Matthey PLC, London (GB)

( * ) Notice: Subject to any disclaimer, the term of this patent is extended or adjusted under 35 U.S.C. 154(b) by 0 days.

(21) Appl. No.: 10/501,631

(22) PCT Filed: Dec. 23, 2002

(86) PCT No.: PCT/GB02/05905

§ 371 (c)(1),
(2), (4) Date: Jul. 15, 2004

(87) PCT Pub. No.: WO03/062142

PCT Pub. Date: Jul. 31, 2003

(65) Prior Publication Data

US 2005/0080146 A1    Apr. 14, 2005

(30) Foreign Application Priority Data

Jan. 16, 2002    (GB) ................................ 0200891.0

(51) Int. Cl.
*C07C 27/00* (2006.01)
(52) U.S. Cl. ...................... 518/700; 518/702; 518/703; 518/704
(58) Field of Classification Search ................ 518/700, 518/702, 703, 704
See application file for complete search history.

(56) References Cited

U.S. PATENT DOCUMENTS

| | | | |
|---|---|---|---|
| 4,690,690 A | 9/1987 | Andrew et al. |
| 4,695,442 A | 9/1987 | Pinto et al. |
| 5,245,110 A | 9/1993 | Van Dijk et al. |
| 5,733,941 A | 3/1998 | Waycuilis |
| 6,172,124 B1 | 1/2001 | Wolflick et al. |
| 6,534,551 B1 | 3/2003 | Allam et al. |
| 6,596,780 B1 | 7/2003 | Jahnke et al. |

FOREIGN PATENT DOCUMENTS

| | | |
|---|---|---|
| WO | WO-97/48639 | 12/1997 |
| WO | WO-00/09441 | 2/2000 |
| WO | WO-00/58242 | 10/2000 |

OTHER PUBLICATIONS

International Search Report dated Apr. 9, 2003, from International Application No. PCT/GB02/05905.

Primary Examiner—J. Parsa
(74) Attorney, Agent, or Firm—RatnerPrestia

(57) ABSTRACT

Synthesis gas for a Fischer-Tropsch process is obtained by primary steam reforming a hydrocarbon feedstock in tubes in a heat exchange reformer, subjecting the primary reformed gas to secondary reforming and using the hot secondary reformed gas to heat the tubes in the heat exchange reformer. The resultant reformed gas is cooled, de-watered and used to form hydrocarbons in the Fischer-Tropsch process. At least part of the tail gas from the Fischer-Tropsch process is combusted in a gas turbine to provide power for the reforming process.

5 Claims, 1 Drawing Sheet

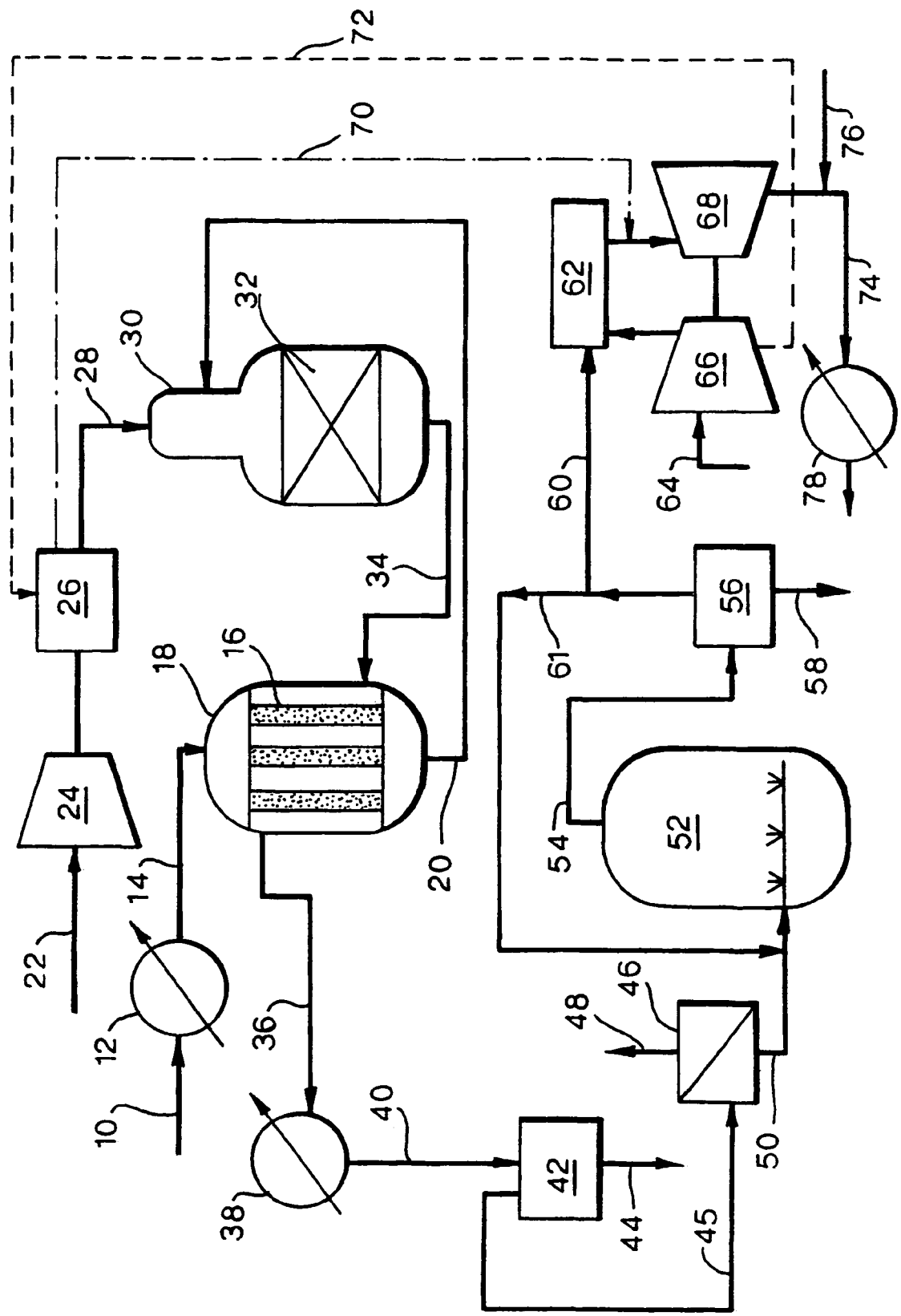

PROCESS FOR THE PRODUCTION OF HYDROCARBONS

This application is the U.S. national phase application of PCT International Application No. PCT/GB02/05905, and claims priority of British Patent Application No. 0200891.0.

FIELD OF THE INVENTION

Hydrocarbons

This invention relates to the Fischer Tropsch process for the production of hydrocarbons and in particular to the efficient use of carbon values in the feedstock for the production of synthesis gas containing hydrogen and carbon oxides by the catalytic reaction of steam with a hydrocarbon feedstock to be used in the Fischer Tropsch process to produce hydrocarbons.

BACKGROUND OF THE INVENTION

In the Fischer-Tropsch process, a synthesis gas containing carbon monoxide and hydrogen is reacted in the presence of a catalyst, which is typically a cobalt- and/or iron-containing composition. The process may be effected using one or more fixed catalyst beds or using a moving catalyst, for example a slurry of the catalyst in a hydrocarbon liquid. The product hydrocarbon liquid is separated from the residual gas. The reaction may be carried out in a single pass or part of the residual gas may be combined with fresh synthesis gas and recycled to the Fischer-Tropsch reactor. Any residual gas which is not recycled to the Fischer-Tropsch reactor for further reaction is here termed tail gas. The tail gas contains some light hydrocarbons, e.g. paraffins including methane, ethane, butane, olefins such as propylene, alcohols such as ethanol, and traces of other minor components such as organic acids, in addition to unreacted hydrogen and carbon monoxide. It will generally also contain some carbon dioxide, which may be present in the synthesis gas fed to the Fischer-Tropsch reaction and/or is formed by side reactions. Possibly, as a result of incomplete separation of the liquid hydrocarbon product, the tail gas may also contain a small proportion of higher hydrocarbons, i.e. hydrocarbons containing 5 or more carbon atoms. These components of the tail gas represent a valuable source of fuel.

Steam reforming is widely practised and is used to produce hydrogen streams and synthesis gas for a number of processes such as ammonia, methanol and the Fischer-Tropsch process.

In a steam reforming process, a desulphurised hydrocarbon feedstock, e.g. natural gas or naphtha, is mixed with steam and passed at elevated temperature and pressure over a suitable catalyst, generally a transition metal, especially nickel, on a suitable support, for example alumina, magnesia, zirconia, or a calcium aluminate cement. In the steam reforming process, any hydrocarbons containing two or more carbon atoms that are present are converted to carbon monoxide and hydrogen, and in addition, the reversible methane/steam reforming and shift reactions occur. The extent to which these reversible reactions proceed depends upon the reaction conditions, e.g. temperature and pressure, the feed composition and the activity of the reforming catalyst. The methane/steam reforming reaction is highly endothermic and so the conversion of methane to carbon oxides is favoured by high temperatures. For this reason, steam reforming is usually effected at outlet temperatures above about 600° C., typically in the range 650° C. to 950° C., by passing the feedstock/steam mixture over a primary steam reforming catalyst disposed in externally heated tubes. The composition of the product gas depends on, inter alia, the proportions of the feedstock components, the pressure and temperature. The product normally contains methane, hydrogen, carbon oxides, steam and any gas, such as nitrogen, that is present in the feed and which is inert under the conditions employed. For Fischer-Tropsch synthesis, it is desired that the molar ratio of hydrogen to carbon monoxide is about 2 and the amount of carbon dioxide present is small.

In order to obtain a synthesis gas more suited to Fischer-Tropsch synthesis, the primary reformed gas may be subjected to secondary reforming by partially combusting the primary reformed gas using a suitable oxidant, e.g. air or oxygen. This increases the temperature of the reformed gas which is then passed adiabatically through a bed of a secondary reforming catalyst, again usually nickel on a suitable support, to bring the gas composition towards equilibrium. Secondary reforming serves three purposes: the increased temperature resulting from the partial combustion and subsequent adiabatic reforming results in a greater amount of reforming so that the secondary reformed gas contains a decreased proportion of residual methane. Secondly the increased temperature favours the reverse shift reaction so that the carbon monoxide to carbon dioxide ratio is increased. Thirdly the partial combustion effectively consumes some of the hydrogen present in the reformed gas, thus decreasing the hydrogen to carbon oxides ratio. In combination, these factors render the secondary reformed gas formed from natural gas as a feedstock more suited for use as synthesis gas for applications such as Fischer-Tropsch synthesis than if the secondary reforming step was omitted. Also more high grade heat can be recovered from the secondary reformed gas: in particular, the recovered heat can be used to heat the catalyst-containing tubes of the primary reformer. Thus the primary reforming may be effected in a heat exchange reformer in which the catalyst-containing reformer tubes are heated by the secondary reformed gas. The use of oxygen as an oxidant rather than air gives further benefits because no inert nitrogen is introduced into the synthesis gas. This means that recycle of $CO_2$ which can be easily absorbed from the syngas in the absence of nitrogen or recycle of unreacted FT reaction tail gas are both feasible and increase the feed gas conversion efficiency to FT liquids. Examples of such reformers and processes utilising the same are disclosed in for example U.S. Pat. Nos. 4,690,690 and 4,695,442.

It has been proposed in WO 00/09441 to employ a reforming process wherein the feedstock/steam mixture is subjected to primary reforming over a catalyst disposed in heated tubes in a heat exchange reformer, the resultant primary reformed gas is then subjected to secondary reforming by partially combusting the primary reformed gas with an oxygen-containing gas and bringing the resultant partially combusted gas towards equilibrium over a secondary reforming catalyst, and then the resultant secondary reformed gas is used to heat the tubes of the heat exchange reformer. In the aforesaid WO 00/09441 carbon dioxide was separated from the product, before or after use thereof for the synthesis of carbon containing compounds, and recycled to the reformer feed. In one embodiment described in that reference, the recycled carbon dioxide was part of the tail gas from a Fischer-Tropsch synthesis process, and was added to the natural gas feedstock prior to desulphurisation of the latter.

U.S. Pat. No. 5,733,941 describes a Fischer-Tropsch process wherein the synthesis gas is produced in an autothermal reformer. The Fischer-Tropsch tail gas is combusted and used to drive a power turbine. The heat from the reformer is passed through a plurality of heat exchangers and the recovered heat is used to raise steam and to pre-heat the reformer hydrocarbon feed gas, Fischer-Tropsch synthesis gas feed and the Fischer-Tropsch tail gas. Although the tail gas is used for power generation, there is still the need for high-pressure steam generation from the heat of the reformer.

U.S. Pat. No. 6,172,124 describes a so-called gas-to-liquids process in which the Fischer-Tropsch tail gas is used to fuel a gas turbine which powers the air compressors used in the process. The synthesis gas is also made in an autothermal reformer in which air and steam is reacted with the hydrocarbon feed gas to generate a syngas mixture containing nitrogen, carbon monoxide and hydrogen. The heat generated in the reformer is recovered from the syngas stream and used to generate steam.

When secondary reformed gas is used to heat the tubes of the heat exchange reformer in which the primary reforming reaction takes place, i.e. when a gas-heated reformer (GHR) is used for the production of synthesis gas, the heat from the reforming reaction is recovered efficiently without the need for high-pressure steam generating plant This is in contrast with the operation of a conventional autothermal reformer, as described for example in U.S. Pat. Nos. 5,733,941 and U.S. Pat. No. 6,172,124 where the heat from the synthesis gas product stream must be recovered in a system of heat exchangers and used for steam generation. Whilst the use of a GHR for production of synthesis gas offers the potential for reducing the steam generation plant required, the overall power requirements of the gas-to-liquids process usually require that steam generation plant is provided for generation of power by means of steam turbines etc. Such steam generation plant may be fuelled by the Fischer-Tropsch tail gas, supplemented with another fuel source, e.g. natural gas which could otherwise be used to generate synthesis gas. Clearly the use of supplemental fuel reduces the overall carbon efficiency of the gas-to-liquids process and the necessity to provide steam generation adds to the cost of the plant.

EP-A-1197471 describes a process for the production of synthesis gas, suitable for feeding to Fischer-Tropsch processes, whereby a hydrocarbon feedstock, e.g. natural gas is reacted with steam and/or oxygen and at least part of any steam requirement is provided by heat exchange against exhaust gas from a gas turbine driving an air separation unit supplying at least part of the oxygen requirement in synthesis gas production. Whereas the gas turbine is fed by a combustible fuel gas that may contain a portion of the Fischer-Tropsch process tail gas, the production of synthesis gas does not comprise primary reforming of the hydrocarbon feedstock/steam mixture over a catalyst disposed in heated tubes in a heat exchange reformer, subjecting the resultant primary reformed gas to secondary reforming by partially combusting the primary reformed gas with an oxygen-containing gas and bringing the resultant partially combusted gas towards equilibrium over a secondary reforming catalyst, and then using the resultant secondary reformed gas to heat the tubes of the heat exchange reformer.

We have found that a gas-to-liquids process employing such a synthesis gas production process may be made more efficient when the Fischer-Tropsch tail gas is used to fuel a gas turbine for power generation.

SUMMARY OF THE INVENTION

Accordingly the present invention provides a process for the production of hydrocarbons by the Fischer-Tropsch reaction comprising a) subjecting a mixture of a gaseous low-hydrocarbon feedstock and steam to steam reforming by
   i) passing the mixture over a catalyst disposed in heated tubes in a heat exchange reformer,
   ii) subjecting the resultant primary reformed gas to secondary reforming by partially combusting the primary reformed gas with oxygen and bringing the resultant partially combusted gas towards equilibrium over a secondary reforming catalyst, and
   iii) using the resultant secondary reformed gas to heat the tubes of the heat exchange reformer, thereby producing a partially cooled reformed gas, b) further cooling the partially cooled reformed gas to below the dew point of the steam therein to condense water and separating condensed water to give a de-watered synthesis gas, c) passing said de-watered synthesis gas through a hydrocarbon synthesis reaction to form a reaction products stream, d) separating at least a part of said reaction products stream into a hydrocarbons product stream and a tail gas stream, e) combusting at least a part of said tail gas to produce a combustion gas, and f) using said combustion gas to drive a turbine, thereby to produce power from said turbine.

In a further aspect of the invention, we provide a chemical plant apparatus for producing a liquid hydrocarbon product from a low-hydrocarbon feed gas and steam comprising:

a) a heat exchange primary reformer which comprises a shell, a plurality of reaction tubes disposed within said shell and containing a reforming catalyst, and means for flowing a heat transfer medium within said shell to heat said reaction tubes, b) a secondary reformer comprising an upstream combustion region and a downstream reforming region comprising a bed of a reforming catalyst, and means to introduce an oxygen-rich gas and a primary reformed gas into said combustion region, c) means to transfer a secondary reformed gas from said secondary reformer into the shell of said primary reformer d) means for transferring said secondary reformed gas from said primary reformer shell via dewatering means to a hydrocarbon synthesis reactor e) a hydrocarbon synthesis reactor f) means for separating a synthesised hydrocarbon stream produced in said hydrocarbon synthesis reactor into a liquid hydrocarbon product stream and a tail gas stream g) gas turbine apparatus comprising an air compressor, a combustion chamber and a turbine unit h) means for transferring at least a portion of said tail gas to the combustion chamber of said gas turbine.

BRIEF DESCRIPTION OF THE DRAWINGS

The invention is illustrated by reference to the accompanying drawing in which FIG. 1 is a diagrammatic flowsheet of an embodiment of the invention.

DETAILED DESCRIPTION OF THE INVENTION

In the present invention at least part of the tail gas is used for combustion in a gas turbine to provide power for the process. This leads to benefits in process power efficiency and may result in significant plant cost savings because the need for high-pressure steam turbine plant may be significantly reduced or eliminated.

Generally referring to the present invention, the amount of oxygen required in the secondary reformer is determined by two main considerations, viz. the desired composition of the product gas, and the heat balance of the heat exchange reformer. Thus generally increasing the amount of oxygen causes the $[H_2]/[CO]$ ratio to decrease and the proportion of carbon dioxide to decrease. Alternatively, if the conditions are arranged such that the product composition and temperature is kept constant, increasing the temperature at which the feedstock is fed to the heat exchange reformer decreases the amount of oxygen (at a constant oxygen feed temperature) required. Decreasing the required amount of oxygen is advantageous as this means that a smaller, and hence cheaper, air separation plant can be employed to produce the oxygen. The temperature of the feedstock can be increased by any suitable heat source, which may, if necessary, be a fired heater, which of course can use air, rather than oxygen, for the combustion.

The amount of oxygen required in the secondary reformer is determined by two main considerations, viz. the desired composition of the product gas, and the heat balance of the heat exchange reformer. Thus generally increasing the amount of oxygen causes the $[H_2]/[CO]$ ratio to decrease and the proportion of carbon dioxide to decrease. Alternatively, if the conditions are arranged such that the product composition and temperature is kept constant, increasing the temperature at which the feedstock is fed to the heat exchange reformer decreases the amount of oxygen (at a constant oxygen feed temperature) required. Decreasing the required amount of oxygen is advantageous as this means that a smaller, and hence cheaper, air separation plant can be employed to produce the oxygen. The temperature of the feedstock can be increased by any suitable heat source, which may, if necessary, be a fired heater, which of course can use air, rather than oxygen, for the combustion.

The oxygen which is combusted with the primary reformed gas in step a)(ii) is provided by feeding an oxygen-rich gas which is preferably >90% especially >95% oxygen. The oxygen-rich gas is preferably produced in an air-separation unit The use of an oxygen-rich gas instead of air to provide the oxygen for partial combustion of the primary reformed gas reduces the volume of inert gas (mostly nitrogen) introduced into the process. The presence of inert gases reduces the fuel energy value, i.e. BTU content of the resultant tail gas stream and so preferably they are minimised.

The hydrocarbon synthesis reaction is preferably a Fischer-Tropsch (F-T) reaction such as is well know in the art. In a F-T process a synthesis gas containing carbon monoxide and hydrogen is reacted in the presence of a catalyst, which is typically a cobalt- and/or iron-containing composition. The F-T reactor type may be fixed bed, slurry reactor type or other suitable reactor configuration know to those skilled in the art. The desired products are liquid hydrocarbons (F-T hydrocarbons) which are separated, usually in a first separation stage with formed water, from the gaseous reaction products that contain unreacted gasses. Part of the gaseous reaction products stream is usually recycled to the F-T process, however in order to avoid a build-up of inert gasses in the process, a purge stream of F-T tail gas is also separated from the reaction products stream.

The F-T reactor requires continuous cooling and the heat removed may be used to generate LP steam.

At least a part of the F-T tail gas stream, which contains some hydrogen and hydrocarbon is used to fuel a gas turbine apparatus for power generation. Optionally, one or more additional purge streams, for example from $H_2$ recovery or a hydrocracker, may be combined with the F-T tail gas stream prior to feeding to the gas turbine combustor. A further part of the F-T tail gas stream may be recycled to the secondary reformer I.e. part of the F-T tail gas may be fed to the primary reformed gas before combustion thereof. The fuel energy value of the tail gas is generally in the range 2000–10000 BTU/lb and such recycle provides a useful source of fuel.

The gas turbine is of conventional form and comprises an air compressor, a combustion chamber and the turbine apparatus within which the combustion gases are expanded to drive the turbine and thereby rotate the power-output shaft(s). The tail gas is fed to the combustion chamber of the gas turbine where it is combusted with the air from the air compressor. Heat is preferably recovered from the turbine exhaust gas and used in the process. For example, the heat present in the gas turbine exhaust gas can be used to superheat the low pressure (LP) steam from the F-T reactor and to provide heat for the process steam saturator system. Additional supplementary fuel may be combusted in the exhaust duct to provide sufficient heat. The superheated LP steam is used to drive steam turbines. We have found that a considerable amount of power may be generated from LP steam.

In a preferred embodiment, some of the air from the air compressor section of the gas turbine is diverted to the air separation unit which supplies the oxygen-rich combustion gas for the secondary reformer. In this case means such as a conduit for transporting the diverted air is provided in the plant This has the advantage of reducing the power requirement of any air compressor which supplies the air separation unit. Typically an amount of up to about 20% of the gas turbine compressor volumetric air flow may be extracted for supply to the air separation unit.

When the oxygen-rich gas for the secondary reforming reaction is provided by an air separation unit a significant amount of unwanted inert gas (mostly nitrogen) is also formed in pressurised form. It is further preferred that the inert gases, generated from the air separation process, are injected into the gas turbine in order to increase the volume of gas flowing through the turbine and thus increase the power output. In this embodiment conduit means are provided to transport the gas from the air separation unit to the gas turbine apparatus.

Some heat exchange between the compressed air stream and the inert gas stream from the air separator may advantageously take place in order to heat the inerts and cool the compressed air slightly before injection into the gas turbine. When operating with an injection of inerts, it is preferred to balance, at least approximately, the flows through the gas turbine compressor and the turbine. Therefore the molar flow-rate of inert gas injected into the turbine and the molar flow-rate of compressed air diverted from the gas turbine compressor are preferably kept approximately equal.

The power generated by the gas turbine may be used directly to provide power to a number of the process operations within the gas to liquids process. The power may be used directly for driving e.g. the air separation unit, the F-T recycle compressor, tail gas compressor or a F-T hydrocarbon recovery refrigeration system. Some or all of the power may be led to an alternator to provide electricity where needed in the process.

If necessary, a supplemental hydrocarbon fuel may be supplied to the gas turbine apparatus if the fuel value available in the tail gas is insufficient to supply the power required for the process operations. Conveniently the supplemental fuel may be natural gas because it is likely that a natural gas supply will be available to provide the hydrocarbon feedstock for the reforming operation.

The gas turbine apparatus is selected to be of an appropriate size and specification for the plant, taking into account the gas flows available and the power output required. Preferably the gas turbine is selected so as to operate at between 80% and 100% of its capacity to maximise the cost efficiency of the unit. The skilled person may, using his experience, select a suitable gas turbine apparatus for a particular plant design.

In FIG. 1, a mixture of a desulphurised hydrocarbon feedstock, for example natural gas, and steam is fed, typically at a pressure in the range of 10 to 50 bar abs., via line 10 to a heat exchanger 12 and thence, via line 14, to the catalyst-containing tubes 16 of a heat exchange reformer 18. The mixture is typically heated to a temperature in the range 350 to 550° C. prior to entry into the tubes 16. For simplicity only three tubes are shown in the drawing: in practice there may be several tens or hundreds of such tubes.

The feedstock/steam mixture undergoes primary steam reforming in the tubes 16 and the primary reformed gas leaves the heat exchange reformer 18 via line 20, typically at a temperature in the range 600 to 800° C. The primary reformed gas is fed via line 20 to a secondary reformer 30, to which oxygen is supplied via line 28. Air in line 22 is compressed in air compressor 24 and fed to an air separation unit 26, from which an oxygen rich gas is fed via line 28 to the secondary reformer 30.

The primary reformed gas/tail gas mixture is partially combusted in the secondary reformer and brought towards equilibrium by passage over a secondary reforming catalyst 32. The secondary reformed gas leaves secondary reformer via line 34, typically at a temperature in the range 850 to 1150° C.

Heat is recovered from the hot secondary reformed gas by passing the secondary reformed gas via line 34 to the shell side of the heat exchange reformer 18 so that the secondary reformed gas forms the heating medium of the heat exchange reformer. The secondary reformed gas is thus cooled by heat exchange with the gas undergoing reforming in the tubes 16 and leaves the heat exchange reformer via line 36, typically at a temperature 50 to 150° C. above the temperature at which the hydrocarbon feedstock/steam mixture is fed to the tubes 16.

The partially cooled secondary reformed gas is then cooled further with heat recovery in one or more heat exchangers 38 to a temperature below the dew point of the water in the secondary reformed gas. The recovered heat may be used to heat the process saturator (not shown) which provides process steam for the synthesis reaction. The cooled secondary reformed gas is then fed via line 40 to a separator 42 wherein condensed water is separated as a liquid water stream 44. This water can be recycled by heating it and contacting the hydrocarbon feedstock with the resultant hot water in a saturator to provide the hydrocarbon steam mixture.

The remaining de-watered gas is then fed, via line 45, to an optional hydrogen separation unit 46, e.g. a membrane unit or a pressure swing adsorption stage, to separate part of the hydrogen in the de-watered gas as a hydrogen stream 48. Hydrogen from the hydrogen separator may be used for hydrodesulphurisation of the parent hydrocarbon feedstock fed to the heat exchange reformer 18. Also, hydrogen from this stage may be combined with a F-T tail gas before combusting in a gas turbine.

The resultant de-watered, hydrogen depleted gas is then fed via line 50 to a Fischer-Tropsch synthesis reactor 52, and the product stream is separated in a separation unit 56, into a liquid hydrocarbons stream together with by-product water, as a hydrocarbons product stream 58 and a gaseous product stream 61 which also contains unreacted gasses. The desired liquid hydrocarbons are subsequently separated from the liquid hydrocarbons product stream 58 (not shown). LP steam may be generated directly or indirectly from the coolant required to cool the FT reactor and this steam can be superheated to drive steam turbines.

The gaseous product stream 61 is recycled to the F-T reactor 52 via line 50. A F-T tail gas is purged as stream 60 from the gaseous product stream 61 to avoid a build up of inert gasses, e.g. nitrogen which may be present in the hydrocarbon feedstock as a contaminant and/or is often present in small amounts as an impurity in the oxygen used for the partial combustion. The purged tail gas stream 60 is burned in the combustor 62 of a gas turbine unit.

The gas turbine unit comprises air compressor 66, combustor 62 and turbine 68. Air is supplied to compressor 66 by line 64. The combusted gas is expanded through the turbine unit 68, thereby generating power in the turbine shaft. Heat may be recovered from the turbine exhaust duct 74 via exchangers 78 and used in the process for LP steam superheating or process saturator heating. Additional heat may be introduced into the exhaust duct by combusting supplementary natural gas fuel in the duct introduced from line 76.

In one embodiment of the invention, line 70 may be used to transport compressed nitrogen and other inert gases from the air separation unit to the turbine inlet in order to increase the gas flow through turbine 68. Line 72 may be used in a further embodiment of the invention to transport a portion of the compressed air generated by the air compressor unit 66 to the air separation unit, which reduces the amount of power required by the air compressor 24 which supplies compressed air to the air separation unit 26.

The invention is further illustrated by then following calculated example of a process in accordance with the above flowsheet. In the following table the pressures (P, in bar abs.), temperatures (T, in ° C.) and flow rates (kg/h) of the various components of the streams are quoted, rounded to the nearest integer. The examples in the table show the performance of a gas-to-liquids (GTL) process producing 15,000 BBL/day of F-T liquid hydrocarbon product. In comparative case (a) the F-T tail gas is combusted in a waste heat boiler (with supplementary natural gas firing) to generate HP steam for power generation. In case (b) which is a process according to the invention, the F-T tail gas is combusted in a gas turbine (with supplementary natural gas firing) to generate power. In case (b) the process is essentially as described above and illustrated in the drawing. The process incorporates the optional features of injecting $N_2$ derived from the air separation unit into the gas turbine and of providing compressed air derived from the gas turbine air compressor to the air separation unit.

|  | (a) COMPARATIVE | (b) INVENTION |
| --- | --- | --- |
| FUEL | (kg/h) | (kg/h) |
| FT tail gas | 36450 | 36450 |
| Gas turbine NG fuel | N/A | 1497 |
| Duct burner NG fuel | N/A | 3514 |
| WHB NG Fuel | 7955 | N/A |
| STEAM GENERATION | (te/h) | (te/h) |
| HP STEAM (40 BarA) | 67 | N/A |
| LP STEAM (13 BarA) | 402 | 402 |
| POWER DEMAND | 74 MW | 70 MW |
| POWER GENERATION | (MW) | (MW) |
| HP ASU TURBINE | 4 | N/A |
| LP ASU TURBINE | 44.5 | 44 |
| COMPRESSOR TURBINE DRIVES | 3 | 3 |
| ALTERNATOR TURBINE | 22.5 | N/A |
| GAS TURBINE | N/A | 23 |
| TOTAL | 74 | 70 |
| CARBON EFFICIENCY | 75.4% | 77.4% |
| ENERGY | 8.5 GJ/BBL | 8.29 GJ/BBL |

It can be seen from the table that case (b) exhibits improvements in efficiency over comparative case (a). In addition, the requirement for HP steam generation has been eliminated in case (b) and thus the capital cost of the plant may be reduced accordingly.

The invention claimed is:

1. A process for the production of hydrocarbons by the Fischer-Tropsch reaction comprising
   a. subjecting a mixture of a gaseous desulphurised hydrocarbon feedstock and steam to steam reforming by:
      i. passing the mixture over a catalyst disposed in heated tubes in a heat exchange reformer,
      ii. subjecting the resultant primary reformed gas to secondary reforming by partially combusting the primary reformed gas with oxygen provided by an oxygen-rich gas comprising >90% oxygen and bringing the resultant partially combusted gas towards equilibrium over a secondary reforming catalyst, and
      iii. using the resultant secondary reformed gas to heat the tubes of the heat exchange reformer, thereby producing a partially cooled reformed gas,
   b. further cooling the partially cooled reformed gas to below the dew point of the steam therein to condense water and separating condensed water to give a de-watered synthesis gas,
   c. passing said de-watered synthesis gas through a hydrocarbon synthesis reaction to form a reaction products stream,
   d. separating at least a part of said reaction products stream into a hydrocarbons product stream and a tail gas stream,
   e. combusting at least a part of said tail gas to produce a combustion gas, and
   f. using said combustion gas to drive a turbine, thereby to produce power from said turbine.

2. A process as claimed in claim 1, wherein said oxygen rich gas is provided by an air separation unit and wherein nitrogen generated by said air separation unit is fed to said turbine.

3. A process as claimed in claim 1, wherein said turbine is a part of an integrated gas turbine apparatus comprising an air compressor for supplying compressed air for use in said gas turbine apparatus, a combustion chamber and said turbine.

4. A process as claimed in claim 3, wherein a portion of the compressed air is supplied to an air separation unit.

5. A process as claimed in claim 1 wherein the exhaust gases from the gas turbine are passed through a heat exchanger to recover heat for use in the process.

* * * * *